United States Patent
Busch et al.

(10) Patent No.: US 11,597,855 B2
(45) Date of Patent: Mar. 7, 2023

(54) THERMALLY ACTIVATABLE LATENTLY REACTIVE ADHESIVE FILM

(71) Applicant: Lohmann GmbH & Co. KG, Neuwied (DE)

(72) Inventors: Christian Busch, Neuwied (DE); Patrick Kopf, Neuwied (DE); Daniela Segschneider, Sinzig (DE)

(73) Assignee: Lohmann GmbH & Co. KG, Neuwied (DE)

( * ) Notice: Subject to any disclaimer, the term of this patent is extended or adjusted under 35 U.S.C. 154(b) by 141 days.

(21) Appl. No.: 16/312,557

(22) PCT Filed: Jun. 30, 2017

(86) PCT No.: PCT/EP2017/066294
§ 371 (c)(1),
(2) Date: May 21, 2019

(87) PCT Pub. No.: WO2018/002312
PCT Pub. Date: Jan. 4, 2018

(65) Prior Publication Data
US 2020/0032110 A1 Jan. 30, 2020

(30) Foreign Application Priority Data
Jun. 30, 2016 (DE) .................... 10 2016 007 914.2

(51) Int. Cl.
*C09J 7/25* (2018.01)
*C09J 7/35* (2018.01)
*C08G 18/75* (2006.01)
*C08G 18/76* (2006.01)
*C09J 175/06* (2006.01)
*C09J 175/08* (2006.01)

(52) U.S. Cl.
CPC .............. *C09J 7/35* (2018.01); *C08G 18/755* (2013.01); *C08G 18/7621* (2013.01); *C09J 7/25* (2018.01); *C09J 175/06* (2013.01); *C09J 175/08* (2013.01); *C09J 2203/326* (2013.01); *C09J 2301/40* (2020.08); *C09J 2475/00* (2013.01); *Y10T 428/28* (2015.01); *Y10T 428/2813* (2015.01); *Y10T 428/2896* (2015.01)

(58) Field of Classification Search
None
See application file for complete search history.

(56) References Cited

U.S. PATENT DOCUMENTS

| | | | | |
|---|---|---|---|---|
| 6,726,971 | B1* | 4/2004 | Wong .................. | C09J 7/22 428/920 |
| 8,927,106 | B2 | 1/2015 | Ho et al. | |
| 2003/0054164 | A1 | 3/2003 | Zimmermann et al. | |
| 2012/0252926 | A1* | 10/2012 | Meyer .................. | C08G 18/725 156/275.7 |
| 2015/0017452 | A1* | 1/2015 | Schmitz-Stapela .... | C09J 175/04 428/425.8 |
| 2015/0037555 | A1* | 2/2015 | Mai ........................ | C09J 175/04 428/339 |
| 2015/0337177 | A1* | 11/2015 | Krawinkel ................. | C09J 7/38 428/337 |

FOREIGN PATENT DOCUMENTS

| | | | |
|---|---|---|---|
| CN | 104185664 A | 12/2014 | |
| CN | 104919017 A | 9/2015 | |
| CN | 107107548 A | 8/2017 | |
| DE | 2 302 103 A1 | 7/1973 | |
| DE | 20 2004 019 782 U1 | 3/2005 | |
| DE | 10 2004 057 292 A1 | 6/2006 | |
| DE | 10 2007 045 166 A1 | 4/2009 | |
| DE | 10 2013 217 880 A1 | 3/2015 | |
| EP | 1 249 480 A1 | 10/2002 | |
| EP | 2 391 686 B1 | 10/2012 | |
| EP | 2 552 987 B1 | 3/2014 | |
| KR | 10-2016-0035213 A | 3/2016 | |
| WO | WO-2013127697 A1 * | 9/2013 | ........... B32B 38/004 |
| WO | 2013/174430 A1 | 11/2013 | |
| WO | WO-2014095382 A1 * | 6/2014 | ................ C09J 7/38 |
| WO | 2016/066441 A1 | 5/2016 | |

OTHER PUBLICATIONS

S.Harling et al., "Latent reactive polyurethanes based on toluenediisocyanate-uretdione and polycaprolactones", 2013, International Journal of Adhesion & Adhesives, vol. 46, pp. 26-33 (Year: 2013).*
Myer Kutz (ed), "Mechanical Engineer's Handbook Materials and Engineering Mechanics", 2015, Wiley & Sons. Inc., 4th edition, Part 1, Chapter 9, pp. 369-370. (Year: 2015).*
International Search Report and Written Opinion dated Aug. 31, 2017 in International Application No. PCT/EP2017/066294 (12 pages) with English translation of the International Search Report.
First Office Action and Search Report in corresponding Chinese Patent Application No. 201780039899.X, dated Sep. 3, 2020, with English translations (21 pages).
Ling S. et al., "Polymer Materials", Jun. 30, 2000, pp. 152-153, First Edition, Publisher: Chine Light Industry Press. (Concise Explanation of Relevance Included).
Ya Q. et al., "Introduction to Materials", Aug. 31, 2006, p. 55, First Edition, Publisher: Chongqing University Press. (Conscise Explanation of Relevance Included).

* cited by examiner

*Primary Examiner* — Anish P Desai
(74) *Attorney, Agent, or Firm* — Ruggiero, McAllister & McMahon LLC

(57) ABSTRACT

The invention relates to a thermally activatable reactive adhesive film comprising a carrier film made of thermoplastic polyurethane, which is coated on at least one side with a latently reactive, thermally activatable adhesive compound.

15 Claims, No Drawings

THERMALLY ACTIVATABLE LATENTLY REACTIVE ADHESIVE FILM

CROSS-REFERENCE TO RELATED APPLICATIONS

This application is the U.S. national phase entry under 35 U.S.C. § 371 of International Application No. PCT/EP2017/066294, filed on Jun. 30, 2017, which claims priority to German Patent Application No. 10 2016 007 914.2, filed Jun. 30, 2016.

TECHNICAL FIELD

The present invention concerns a thermoactivatable, latent-reactive adhesive film having a thermoplastic polyurethane (TPU) as backing foil.

PRIOR ART

Adhesive films are sheetlike structures such as, for example, adhesive tapes which come about through the shaping (coating) of adhesive compounds. In the case of solvent-containing adhesive compounds, coating is followed by drying to remove the solvent, in order to obtain the adhesive film. In this case the adhesive films in question have multiple plies.

Adhesive films are occasionally also referred to as adhesive sheets. In general, as also here, the adhesive films are lined at least one-sidedly with an antiadhesive sheetlike structure, referred to as the liner. Oftentimes the adhesive compound is coated directly onto this liner so as to form the adhesive film. The material and the release effect of the liner are selected first so as to ensure optimum coating and drying and secondly so that the adhesive film has good handling properties in the course of further processing and use, especially so that the liner detaches easily again on use.

Backing foils are nontacky sheetlike structures composed of thermoplastic polymers. They are joined directly to one or two layers of the adhesive compounds and together with these layers form the adhesive film.

The term "thermoactivatable adhesive films" is intended here to refer to films which are activated by supply of thermal energy (temperature) and optionally the action of pressure, being adhesively bonded to substrates. In the course of this bonding, adhesive films that are purely thermoactivatable undergo melting. The bonded assembly is formed during cooling as a result of the purely physical solidification. The process is generally reversible. The materials are purely thermoplastic.

The term "thermoactivatable reactive adhesive compounds" is intended here to refer to those which (in general additionally) to the physical solidification also set chemically. This is accomplished by means of a reactive component which is included in the adhesive compound and generates chemical crosslinking or curing of the adhesive compound. This solidification is in general irreversible and cannot be undone by renewed supply of thermal energy. Reactive components may be, for example, thermoactivatable diisocyanates which react with polymer-bonded hydroxyl, amino or amide groups.

Thermoactivatable reactive adhesive films comprise thermal adhesive compounds which are backing less or have been applied to a backing.

Latent-reactive adhesive films are those which under standard conditions do not cure, or cure only over a period of months, and are therefore storage-stable, but which at significantly higher temperatures can be activated and cure. An advantage of the latent-reactivity is that under standard conditions these adhesive films can be stored, transported, and further-processed (to form diecut parts, for example), before then being employed at the bonding site and cured.

A "structural bond" is an adhesive bond for which a possible fracture site does not necessarily have to be located within the layer of adhesive and/or in the backing material with the layer/layers of adhesive between the components being bonded, but may instead occur with equal probability at any other site of the articles bonded by the structural adhesive.

Thermoactivatable reactive adhesive films are known from the patent literature and other literature and also in the form of products. For example, EP 2 391 686 B1 describes a heat-activatable adhesive tape consisting of a nonwoven backing and two thermoplastic layers. The nonwoven carrier is intended on the one hand to improve the damping properties and, in the hot press, to prevent the thermoplastics flowing out. A disadvantage of the nonwoven backing is that under high shearing or torsional loads, of the kind occurring during the use of thermoactivated, reactive adhesive films, it represents a preferential fracture site which may break under relatively high loads. This means that it cannot be used to achieve relatively high strengths.

Likewise known are adhesive films having a polyurethane foil as backing material. For instance, DE 20 2004 019 782 U1 claims an adhesive film constructed from a polyurethane foil with a high melting point, in the middle, with a layer of low-melting foil mounted on one or both sides. The purpose of this low-melting foil is to improve the bondability of the polyurethane foil. No details are given regarding the "chemistry" of the low-melting foils. Nor is it made clear whether the materials in question are thermoactivatable reactive materials or merely thermoplastic materials.

U.S. Pat. No. 8,927,106 B2 describes a multiple-ply protective foil for a vehicle surface that has a layer of thermoplastic polyurethane between a polyurethane layer and a pressure-sensitive adhesive layer.

Reactive polyurethane adhesives as well are known, for example, from DE 102004057292 A1, where the subject is a two-stage method for producing an isocyanate-reactive polyurethane composition, or from KR 2016035213 A, which describes an adhesive film for the fixing of parts of a mobile telecommunications device. This film consists of a TPU backing coated on either side with a ply of adhesive, with the TPU backing layer and the ply of adhesive comprising thermally expandable microcapsules.

Likewise known are thermoplastic polyurethane adhesives for the bonding of textiles—from EP 2552987 B1, for example.

None of these patents, however, is directed to a thermoactivatable latent-reactive adhesive film consisting of a backing foil of thermoplastic polyurethane that is coated at least one-sidedly with a latent-reactive, thermoactivatable adhesive compound.

SUMMARY OF THE INVENTION

Starting from the known prior art, it is an object of the present invention to provide an improved adhesive film.

This problem is solved by means of an adhesive film according to the features of claim 1. Advantageous embodiments are apparent from the dependent claims.

Specified accordingly is a thermoactivatable reactive adhesive film which comprises a backing foil of thermoplastic polyurethane that is coated at least one-sidedly with a latent-reactive, thermoactivatable adhesive compound.

The TPU backing foil provides for a comparative reduction in bleeding during thermal activation, particularly at relatively high adhesive film thicknesses.

The mechanical stabilization is substantially better as a result of the harder TPU interlayer, also at room temperature. As a consequence of this, diecuttability is significantly improved.

The elasticity of the overall assembly becomes better because the TPU interlayer contributes elasticity to the adhesive system.

In one preferred embodiment, the adhesive compound is an adhesive compound based on polyurethane which comprises thermoactivatable isocyanate.

In one preferred embodiment, the softening range of the carrier foil of thermoplastic polyurethane is greater than 120° C., preferably greater than 150° C. The TPU backing foil does not reduce the assembly strength in the bonded state. In spite of the multiple-ply construction with resultant boundary layers, and although a considerable part of the adhesive film consists of thermoplastic material, the overall result is an assembly strength and thermal stability that match those of an adhesive film with a homogeneous reactive construction. This is evident from the values measured for the tensile shear strength and the Shear Adhesive Failure Temperature (SAFT). A precondition is that the softening range of the backing foil is above or in the region of the bonding temperature of the reactive adhesive compound.

If at the bonding temperature the reactive adhesive compound is activated and the backing foil undergoes softening, then the advantage comes about that the boundary layers are able to fuse, and therefore form a strong assembly.

In one development, the backing foil of thermoplastic polyurethane consists substantially of polyetherpolyurethane.

In a further-preferred embodiment, the thermoactivatable isocyanate is an isocyanate based on isophorone diisocyanate or toluene diisocyanate.

In a further-preferred development, the adhesive compound is an adhesive compound based on polyesterpolyurethane.

In a further-preferred embodiment, the total thickness is 40 to 400 μm. Accordingly, the production of relatively thick thermoactivatable reactive adhesive films for the bridging of substantial joints or for the bonding of rough surfaces is possible.

In a further-preferred embodiment, the ratio of the thickness of the backing foil of thermoplastic polyurethane to the sum of the thickness of the layer(s) of the adhesive compound is greater than 0.3 and preferably approximately 1.

Through the variation of the layer thicknesses it is possible to optimize particular combinations of properties of the thermoplastic carrier foil and the reactive adhesive compound. The profile of properties is good especially when the ratio of the thickness of the backing foil to the sum of the thicknesses of the layers of the adhesive compound is greater than 0.3 and more particularly is approximately 1.

Furthermore, the adhesive film of the invention is suitable for use for the adhesive bonding of components in the electronics industry and/or the adhesive bonding of textiles.

The advantages of such a system over a single-layer thermoplastic backing foil construction are as follows:

The construction according to the invention provides a product which is thermoactivatable and therefore cured irreversibly in the ultimate state.

The product is meltable/bondable at lower temperatures than a pure TPU foil (as described inter alia in DE 202004019782 U1), because the outer layers are equipped with lower melting points relative to the backing foil.

Combinations of properties of 2 thermoplastics are possible, resulting for example in different hardnesses. One or other of the materials may dominate via the particular layer thicknesses.

DETAILED DESCRIPTION OF PREFERRED EXEMPLARY EMBODIMENTS

Thermoactivatable Reactive Adhesive Compounds

Thermoactivatable reactive adhesive compounds are familiar to the skilled person. They are, essentially, thermoplastic polymers such as, for example, polyesters, copolyesters, polyolefins, polyamides or polyurethanes to which reactive resins have been added or which themselves comprise reactive components. Reactive resins come from the group, for example, of the epoxy resins, melamine resins, phenolic resins, or the polyisocyanates. Included among thermoactivatable reactive adhesive compounds are those based on epoxy resin, consisting substantially of liquid and solid epoxy resins, impact modifiers, and latent-reactive crosslinking systems such as dicyandiamide, for example. Further thermoactivatable reactive adhesive compounds are those based on cyanoacrylate, which crosslink by the influence of moisture and are described for example in WO 2013/174430.

The adhesive compounds of the invention are based preferably on polyurethane, more preferably on polyesterpolyurethane. The reactive resin is preferably a polyisocyanate, more preferably a polyisocyanate based on isophorone diisocyanate (IPDI) or toluene diisocyanate (TDI).

On thermal activation, the thermoplastic polymer on the one hand is "activated", and so it softens to the point of the melt. On the other hand, though, the reactive resin is activated at the same or a higher temperature. This means that only at or above this activation temperature do the functional groups of the reactive resin react with the base polymers, and the adhesive compound cures. At lower temperatures, the intention is that the reactive resins shall not react, so that the reactive adhesive film can be kept for months. A variety of mechanisms are possible which initiate the curing at the activation temperature: for example, the reactive resin may be present in solid form and may melt only at the activation temperature and hence be made available. Another pathway is the deactivation of the reactive resins through surface deactivation. This deactivation is negated at the activation temperature (e.g., at or above the glass transition temperature) and curing commences. A further possibility is that of chemical blocking of the reactive groups. At a defined temperature, the blocking is reversible and curing commences. Another method is that of the insolubility of the reactive resin in the (semi)crystalline polymer. At or above the decrystallization temperature, solubility comes in and the curing commences.

In the context of this invention, preference is given to surface-deactivated polyisocyanate and to Isocyanates which become active at the decrystallization temperature.

Backing Foils

In the case of the carrier foils it is possible to employ all thermoplastic polymers that are suitable and known to the skilled person, such as, for example, polyesters, polyolefins, polyamides, polyacrylates or polyurethanes. Preference is given to using a thermoplastic polyurethane foil, more preferably a polyurethane foil composed of polyetherpolyurethane.

The melting point or melting range of the carrier foil is selected such that it lies at or above the activation temperature of the reactive adhesive compound, or the bonding temperature. It is possible accordingly to select whether, during the bonding procedure, the carrier foil remains solid or softens or melts. Within these possibilities, the skilled person is able to optimize the mechanical properties before and after bonding. The softening range of the carrier foil of the invention is preferably above 120° C., more preferably above 150° C.

The thickness of the foil, together with the thicknesses of the adhesive layers, is selected such that the total thickness of the adhesive film is from 40 to 400 µm. Here, the skilled person is able to select the distribution of the thicknesses, over the carrier foil and the adhesive layer or layers, in such a way as to optimize the mechanical properties before and after bonding, and the bleeding.

Production Methods

The adhesive film is produced by single-sided or double-sided coating of the carrier foil with the reactive adhesive compound. The reactive adhesive compound may take the form of a 100% system, i.e., solvent-free, or a solvent-containing adhesive compound or dispersion-based adhesive compound. The adhesive compound is preferably in the form of a dispersion-based adhesive compound, and is mixed from a polyurethane dispersion and a dispersion of the deactivated isocyanate. The dispersion-based adhesive compound is coated onto the liner by means of a suitable coating method, and dried. This sheetlike adhesive compound is then laminated onto one side of the carrier foil to produce a solid laminate. A second sheetlike adhesive compound is laminated onto the second side of the carrier foil, and the second liner is removed. This gives an adhesive film consisting of a central carrier foil and two layers of reactive adhesive compound that are lined at least on one side by a liner.

Adhesive Bonding Operation

The materials to be bonded depend on the specific use. Common materials here are plastics, metals, glass, and textiles. Examples would include the bonding of substrates of polycarbonate sheets to one another and the bonding of polycarbonate sheet to aluminum plate. Applications are located, for example, in the electronics industry, in component construction in the automobile industry, and in textile lamination in the context of industrial textiles.

The adhesive bonding operation here is accomplished generally in these steps:
1. Fixing of the adhesive film on a substrate. This is done purely mechanically or else by prelamination—that is, heating of the adhesive film and/or of the substrate to a temperature at which the layer of adhesive compound facing the substrate melts but is not yet chemically activated. As a result of the melting, the adhesive film is able to wet the first substrate. After cooling, the first substrate is provisionally bonded, but the film is not yet cured.
2. Removal of the liner still present.
3. Placement of the second substrate on the open side of the adhesive film.
4. Application of pressure and temperature to the assembly for a specified time. This is accompanied by thermal activation of all the layers.
5. Optionally, cooling of the assembly.

Experimental Section:
Materials

| Material | Supplier | Description |
| --- | --- | --- |
| Dispercoll U 56 | Covestro AG | Aqueous polyurethane dispersion of semicrystalline polyesterpolyurethane. The polyurethane has a melting point of around 60° C. |
| Dispercoll U XP 2702 | Covestro AG | Aqueous polyurethane dispersion of semicrystalline polyesterpolyurethane for crosslinking with IPDI trimer. The polyurethane has a melting point of around 60° C. |
| Dispercoll BL XP 2514 | Covestro AG | Aqueous dispersion of a reactive isocyanate based on TDI dimer. |
| Aqualink D-HT | Aquaspersions Ltd. | Aqueous dispersion of a surface-deactivated IPDI trimer. Activation starts from around 70° C. |
| Borchigel A LA | Borchers GmbH | Thickener based on an anionic acrylic polymer |
| Platilon U073, Thickness 50 µm and 100 µm | Covestro AG | Carrier foil: polyurethane foil based on polyetherpolyurethane, softening point 160-200° C. |

EXAMPLES

Reactive Adhesive Compound 1:
100 parts of Dispercoll U XP 2702, 20 parts of Aqualink D-HT, and 1.3 parts of Borchigel A LA are mixed by stirring.

Reactive Adhesive Compound 2:
100 parts of Dispercoll U 56, 13 parts of Dispercoll BL XP 2514, and 0.5 part of Borchigel A LA are mixed by stirring.

Inventive Example 1

A liner (siliconized glassine paper) is knife-coated with reactive adhesive compound 1. It is subsequently dried at 50° C. for 10 minutes. The drying temperature must not exceed 50° C., so as not to cause premature thermal activation. The application rate is set so that the layer thickness after drying is 50 µm. This film of adhesive compound is applied by lamination at 60° C. to the polyurethane foil which is 100 µm thick. The reverse face of the polyurethane foil is likewise laminated with a second 50 µm film of adhesive compound 1, and a liner is removed. This gives a thermoactivatable reactive adhesive film with a thickness of 200 µm.

Inventive Example 2

A liner (siliconized glassine paper) is knife-coated with reactive adhesive compound 1. It is subsequently dried at 50° C. for 10 minutes. The drying temperature must not exceed 50° C., so as not to cause premature thermal activation. The application rate is set so that the layer thickness after drying is 25 µm. This film of adhesive compound is applied by lamination at 60° C. to the polyurethane foil which is 50 µm thick. The reverse face of the polyurethane foil is likewise laminated with a second 25 µm film of adhesive compound 1, and one of the two liners then present is removed. This gives a thermoactivatable reactive adhesive film with a thickness of 100 µm.

Inventive Example 3

A liner (siliconized glassine paper) is knife-coated with reactive adhesive compound 2. It is subsequently dried at 50° C. for 10 minutes. The drying temperature must not exceed 50° C., so as not to cause premature thermal activation. The application rate is set so that the layer thickness after drying is 25 μm. This film of adhesive compound is applied by lamination at 60° C. to the polyurethane foil which is 50 μm thick. The reverse face of the polyurethane foil is likewise laminated with a second 25 μm film of adhesive compound 2, and one of the two liners then present is removed. This gives a thermoactivatable reactive adhesive film with a thickness of 100 μm.

Comparative Example 1

A liner (siliconized glassine paper) is knife-coated with reactive adhesive compound 1. It is subsequently dried at 50° C. for 10 minutes. The drying temperature must not exceed 50° C., so as not to cause premature thermal activation. The application rate is set so that the layer thickness after drying is 50 μm. Four of these layers are applied to one another by lamination at 60° C. This produces a thickness of 200 μm of a thermoactivatable reactive adhesive film without carrier foil.

Comparative Example 2

A liner (siliconized glassine paper) is knife-coated with reactive adhesive compound 2. It is subsequently dried at 50° C. for 10 minutes. The drying temperature must not exceed 50° C., so as not to cause premature thermal activation. The application rate is set so that the layer thickness after drying is 50 μm. Two of these layers are applied to one another by lamination at 60° C. This produces a thickness of 100 μm of a thermoactivatable reactive adhesive film without carrier foil.

Measurement Methods:
Tensile Shear Strength
Sample Preparation

The adhesive film (with the liner removed) is fixed between two polycarbonate sheets (PC, width 2.5 cm, length 7 cm, thickness 0.3 cm) overlappingly and flush to the edges, with an area of 312.5 mm². The adhesive bonding operation takes place in a hot press at 120° C. and a pressure of 2.5 bar for 5 minutes. The test specimens are subsequently cooled to room temperature under pressure and are stored for 24 hours in a conditioned atmosphere.

Testing

The tensile shear test takes place on a Zwick testing machine between two clamping jaws, with a tensioning velocity of 2 mm/min. The maximum point on the force-displacement curve is the tensile shear strength, and is reported in MPa (=N/mm²). The average from 5 test specimens is taken.

SAFT Test
Sample Preparation

The adhesive film (with the liner removed) is fixed between two polyester foils (PET, width 2.5 cm, length 7 cm, thickness 0.1 mm) overlappingly and flush to the edges, with an area of 312.5 mm². The adhesive bonding operation takes place in a hot press at 120° C. and a pressure of 2.5 bar for 5 minutes. The test specimens are subsequently cooled to room temperature under pressure and are stored for 24 hours in a conditioned atmosphere.

Testing

The test specimens are suspended vertically in a forced-air drying cabinet and loaded with a weight of 10N in each case. The starting temperature is 50° C. Every 30 minutes, a check is made of whether the samples are holding, and the temperature is raised by 10 kelvins. The test is ended at a maximum of 200° C. The SAFT is then the temperature at which all three test specimens have still held.

Push-Out Test
Sample Preparation

The adhesive film is punched out with a circular punch to a diameter of 18 mm.

The first substrate consists of a sheet of polycarbonate or aluminum (width 2.5 cm, length 7 cm, thickness 0.3 cm) which has been provided centrally with a hole of diameter 9 mm. The circular adhesive film is placed on this substrate centrally with respect to the hole. The second substrate consists of a circular sheet of polycarbonate or aluminum in the same size as the adhesive film (diameter 18 mm). The operation of bonding the test specimen takes place in a hot press at a pressure of 2.5 bar for 5 minutes. The test specimens are subsequently cooled to room temperature under pressure and are stored for 24 hours in a conditioned atmosphere.

Two different pushing temperatures were selected:
120° C. pushing temperature: Polycarbonate is bonded to polycarbonate.
200° C. pushing temperature: Anodized aluminum is bonded to anodized aluminum.

Testing

The test specimens are placed on a mandrel of diameter 8 mm, so that the mandrel is able to push the second, circular substrate away from the first substrate. The machine approaches with a fitting counter-pushing tool at a testing velocity of 100 mm/min and pushes the mandrel through the sample against the circular substrate. The test ends at the maximum force of the force-displacement curve. The push-out value is this maximum force and is indicated in N/2.5 cm². The average from 3 measurements is reported.

Table 1: Test Values for the Inventive and Comparative Examples

Layer Thickness Ratio

Layer thickness ratio is intended here to mean the ratio of the thickness of the carrier foil to the sum of the thicknesses of the reactive adhesive layers, i.e.:

Layer thickness ratio=thickness of carrier foil/sum of the thicknesses of reactive adhesive layers and ought to be greater than 0.3.

| | | Thickness [μm] | Tensile shear strength [MPa] | SAFT ° C. | Push-out force after 120° C. [N/2.5 cm²] | Push-out force after 200° C. [N/2.5 cm²] | Bleed test [%] | Layer thickness ratio |
|---|---|---|---|---|---|---|---|---|
| Inventive example 1 | Reactive adhesive compound 1 with backing foil | 200 | 10 | 180 | 300 | 620 | 50 | 1.0 |

-continued

|  |  | Thickness [μm] | Tensile shear strength [MPa] | SAFT °C. | Push-out force after 120° C. [N/2.5 cm$^2$] | Push-out force after 200° C. [N/2.5 cm$^2$] | Bleed test [%] | Layer thickness ratio |
|---|---|---|---|---|---|---|---|---|
| Inventive example 2 | Reactive adhesive compund 1 with backing foil | 100 | 9.6 | 170 | 250 | 600 | 50 | 1.0 |
| Inventive example 3 | Reactive adhesive compound 2 with backing foil | 100 | 8.5 | 160 | 135 | 500 | 50 | 1.0 |
| Comparative example 1 | Reactive adhesive compound 1 without backing foil | 200 | 10 | >200 | 180 | 400 | 124 | 0 |
| Comparative example 2 | Reactive adhesive compound 2 without backing foil | 100 | 8.7 | >200 | 135 | 350 | 110 | 0 |

The test values in table 1 show that the adhesive films of the invention (inventive examples 1 to 3) for the same thickness achieve the same tensile shear strengths as the adhesive films without carriers (comparative examples 1 and 2). This is the case both for adhesive compound 1 and for adhesive compound 2.

Conversely, the adhesive films according to the invention (examples 1 to 3) exhibit a lower bleeding behavior than the adhesive films without backing (comparative examples 1 and 2).

The SAFT value of the adhesive films according to the invention is somewhat lower than for the comparative examples. This is presumably because of the softening of the backing foil. The service temperatures of such bonds, however, are generally below 150° C. even at the peak. Within this range, there would be no difference in the examples in terms of the temperature stability of the bonds.

At pushing temperatures both of 120° C. and of 200° C., the push-out forces are at a level the same as or higher than in the case of the comparative examples.

The invention claimed is:

1. A thermoactivatable reactive adhesive film, comprising a backing foil of thermoplastic polyurethane which is coated on at least one side with a latent-reactive, thermoactivatable adhesive compound, wherein the adhesive compound comprises a polyurethane and a reactive resin comprising a thermoactivatable isocyanate, and wherein a push-out force of the thermoactivatable reactive adhesive film is from 135 to 300 N/2.5 cm$^2$ when an adhesive bonding operation happened at a pressing temperature of 120° C.

2. The thermoactivatable reactive adhesive film as claimed in claim 1, wherein the softening temperature of the backing foil of thermoplastic polyurethane is greater than 120° C.

3. The thermoactivatable reactive adhesive film as claimed in claim 1, wherein the backing foil of thermoplastic polyurethane includes polyetherpolyurethane.

4. The thermoactivatable reactive adhesive film as claimed in claim 1, wherein the thermoactivatable isocyanate is an isocyanate based on isophorone diisocyanate or toluene diisocyanate.

5. The thermoactivatable reactive adhesive film as claimed in claim 1, wherein the polyurethane is based on polyesterpolyurethane.

6. The thermoactivatable reactive adhesive film as claimed in claim 1, wherein the total thickness of the thermoactivable reactive film is 40 to 400 μm.

7. The thermoactivatable reactive adhesive film as claimed in claim 1, wherein the ratio of a thickness of the backing foil of thermoplastic polyurethane to a thickness) of the adhesive compound is greater than 0.3.

8. The thermoactivatable reactive adhesive film as claimed in claim 1, wherein the softening temperature of the backing foil of thermoplastic polyurethane is greater than 150° C.

9. The thermoactivatable reactive adhesive film as claimed in claim 1, wherein a tensile shear strength of the thermoactivatable reactive adhesive film is from 8.5 to 10 MPa.

10. The thermoactivatable reactive adhesive film as claimed in claim 7, wherein the ratio of the thickness of the backing foil of thermoplastic polyurethane to the thickness of the adhesive compound is approximately 1.

11. The thermoactivatable reactive adhesive film as claimed in claim 7, wherein a tensile shear strength of the thermoactivatable reactive adhesive film is from 8.5 to 10 MPa.

12. The thermoactivatable reactive adhesive film as claimed in claim 1, wherein the polyurethane comprises: a semicrystalline polyesterpolyurethane.

13. The thermoactivatable reactive adhesive film as claimed in claim 12, wherein the thermoactivatable isocyanate is an isocyanate based on isophorone diisocyanate or toluene diisocyanate.

14. A thermoactivatable reactive adhesive film, comprising a backing foil of thermoplastic polyurethane which is coated on at least one side with a latent-reactive, thermoactivatable adhesive compound, wherein the adhesive compound comprises a polyurethane and a reactive resin comprising a thermoactivatable isocyanate, and wherein a push-out force of the thermoactivatable reactive adhesive film is from 500 to 620 N/2.5 cm$^2$ when an adhesive bonding operation happened at a pressing temperature of 200° C.

15. A thermoactivatable reactive adhesive film, comprising a backing foil of thermoplastic polyurethane which is coated on at least one side with a latent-reactive, thermoactivatable adhesive compound, wherein the adhesive compound comprises a polyurethane and a reactive resin comprising a thermoactivatable isocyanate, wherein a shear adhesive failure temperature (SAFT) of the thermoactivatable reactive adhesive film is from 160° C. to 180° C.

* * * * *